United States Patent
Barbulescu

[19]

[11] Patent Number: 5,951,883
[45] Date of Patent: Sep. 14, 1999

[54] FLOATING COVER ELECTRODE GUIDE SYSTEM FOR ELECTRIC DISCHARGE MACHINING

[75] Inventor: George Barbulescu, Ann Arbor, Mich.

[73] Assignee: Ann Arbor Machine Company, Chelsea, Mich.

[21] Appl. No.: 08/904,479

[22] Filed: Jul. 31, 1997

[51] Int. Cl.[6] .............................. B23H 7/26; B23H 9/14
[52] U.S. Cl. ...................................... 219/69.15; 219/69.2
[58] Field of Search .............................. 219/69.12, 69.15, 219/69.2

[56] References Cited

U.S. PATENT DOCUMENTS

| | | | |
|---|---|---|---|
| 3,517,153 | 6/1970 | Check | 219/69.15 |
| 3,826,484 | 7/1974 | Check et al. | 219/69.15 |
| 4,782,203 | 11/1988 | Check et al. | 219/69.15 |
| 4,883,933 | 11/1989 | Yatomi et al. | 219/69.12 |
| 4,896,012 | 1/1990 | Barbulescu | 219/69.12 |

FOREIGN PATENT DOCUMENTS

| | | | |
|---|---|---|---|
| 62-166925 | 7/1987 | Japan | 219/69.15 |
| 2-71933 | 3/1990 | Japan | 219/69.15 |
| 5-146919 | 6/1993 | Japan | 219/69.15 |
| 6-55357 | 6/1994 | Japan | 219/69.12 |

Primary Examiner—Geoffrey S. Evans
Attorney, Agent, or Firm—Harness, Dickey & Pierce P.L.C.

[57] ABSTRACT

A micro EDM servo-head is disclosed which includes a servo, a lead screw, a carriage block engaging the lead screw, a support block, a contact block secured to the carriage block, and an electrode guide system coupled to the support block for controlling the position of the electrode of an EDM apparatus to which the micro EDM servo head is attached. The electrode guide system includes an electrode guide bottom having a longitudinal groove, and a floating guide cover which is biased toward the electrode guide bottom such that the electrode is forced into the groove and the position is controlled by forcing the electrode into the groove.

21 Claims, 2 Drawing Sheets

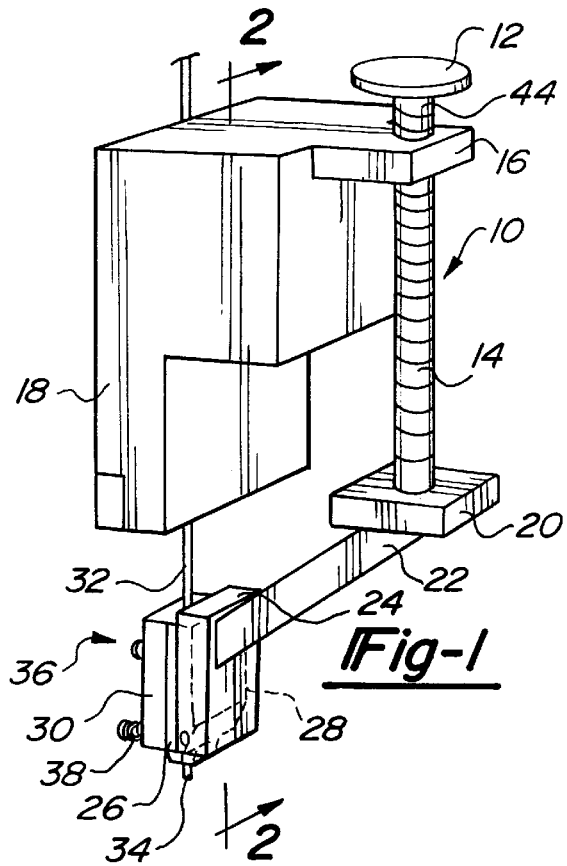
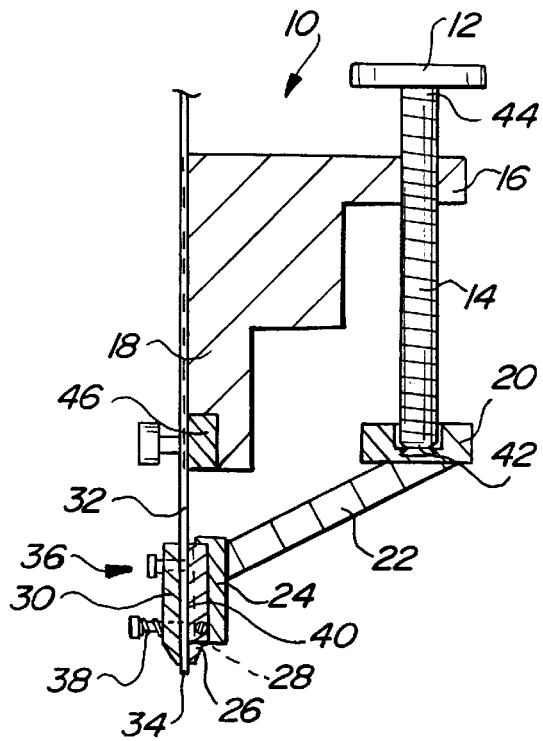
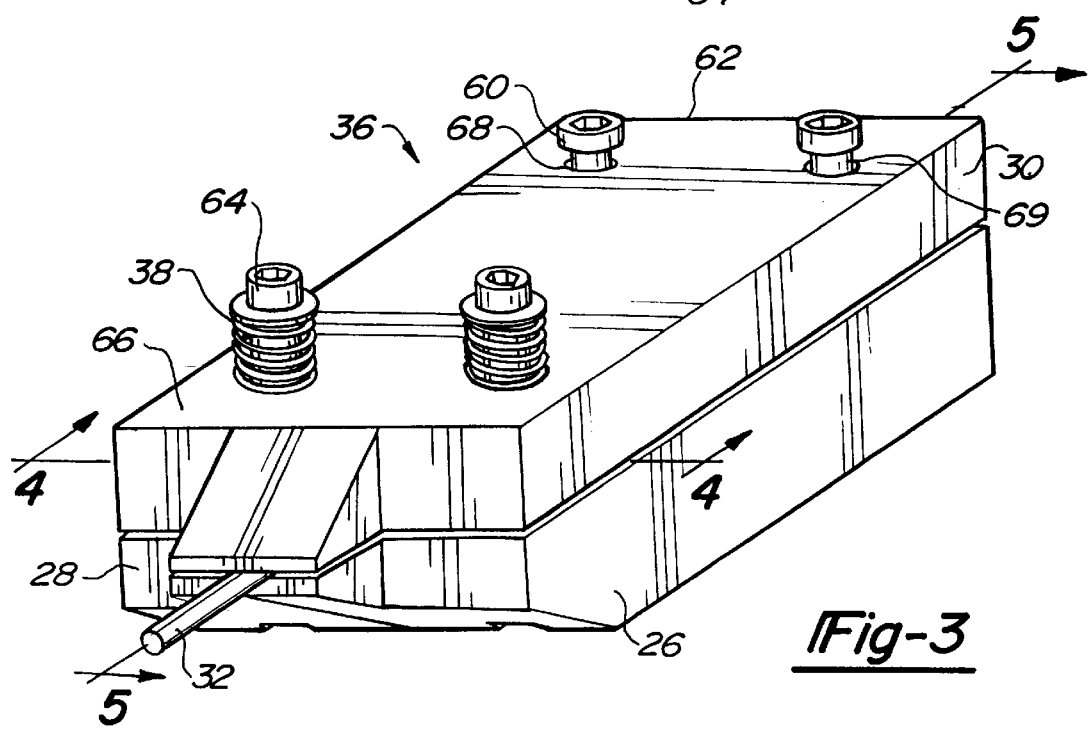

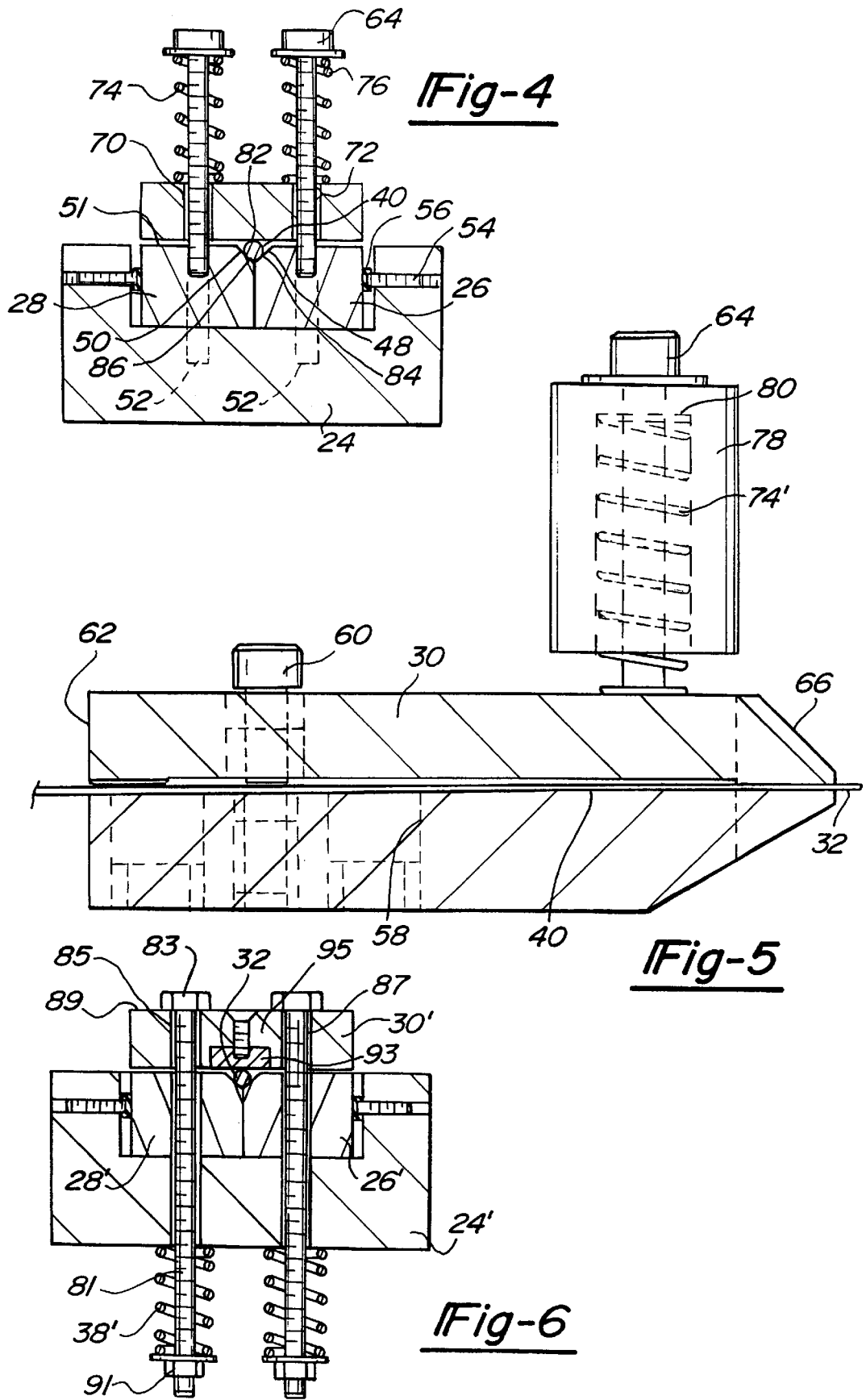

FLOATING COVER ELECTRODE GUIDE SYSTEM FOR ELECTRIC DISCHARGE MACHINING

BACKGROUND OF THE INVENTION

1. Technical Field

This invention generally relates to electric discharge machines (EDM) and, more particularly, to a floating cover electrode guide system for use with an electric discharge machine, the electrode guide system guiding and precisely controlling the position of the electrode of the EDM.

2. Discussion

Electric discharge machines (EDM) are used to machine holes or features in production parts which require very small tolerances. When dealing with holes in the range of as small as 0.003" a variation of plus or minus 0.0005" is a 17% variation either side of nominal. Even though the absolute magnitude of the variation is relatively small, the percentage error would be beyond that acceptable for many production parts. For example, a plus or minus 2% variation in flow rate is an acceptable parameter on some injection nozzles which are machined using the EDM process. In light of these requirements, accurately controlling the position of and limiting the variation of the electrode location is critical. Obviously, a precision control guidance device is required within the industry to achieve the results required in such precise machine work.

In general, the EDM process is based on the principle of erosion of the metal work piece by spark discharges. The spark is an electric discharge through the space between the two charged elements, the first being the work piece and the second being an electrode. The work piece and the electrode are placed within a dielectric fluid. A direct current is applied to the system which includes a capacitor in parallel with the spark gap between the two elements. At low voltages the dielectric fluid acts as an insulator, but as the potential difference between the electrode and the work piece increases there is a dielectric breakdown in the fluid and a spark passes through the spark gap. The spark causes the vaporization of some of the work piece material as well as some of the material of the electrode. Following a spark discharge, deionization of the dielectric fluid reestablishes the insulation properties and the current again drops to zero. The capacitor is then charged again and the process begins over. This process can be repeated at a very high rate (200–500,000 cycles per second) with the metal removal rate being controlled by the current density or average current in the discharge circuit. Typically the higher the current density the rougher the surface finish but more material is removed.

SUMMARY OF THE INVENTION

In accordance with the teachings of the present invention, there is disclosed a micro EDM servo-head for controlling and advancing an electrode of an EDM apparatus. The servo-head includes a servo responsive to the control system of the apparatus, a lead screw, a carriage block engaging the lead screw, a support block supporting one end of the lead screw, a contact block secured to the carriage block, and an electrode guide system attached to the support block for guiding and controlling the electrode. The electrode guide system of the present invention incorporates an electrode guide bottom having a longitudinal groove to guide the electrode. A floating guide cover is coordinated with the electrode guide bottom and is biased against the electrode guide bottom to force the electrode into contact with the groove thereby controlling the position of the electrode as it extends beyond the electrode guide system and machines the workpiece.

BRIEF DESCRIPTION OF THE DRAWINGS

The various advantages of the present invention will become apparent to one skilled in the art upon reading the following specification and by reference to the drawings which include:

FIG. 1 is a perspective view of a micro EDM servo-head made in accordance with the teachings of the present invention;

FIG. 2 is a cross-sectional view of the micro EDM servo-head taken along line 2—2 in FIG. 1;

FIG. 3 is a perspective view of the electrode guide system made in accordance with the teachings of the present invention;

FIG. 4 is a cross-sectional view taken along line 4—4 in FIG. 3;

FIG. 5 is a cross-sectional view taken along lines 5—5 in FIG. 3 and incorporates an alternate biasing means; and FIG. 6 is a cross section similar to FIG. 4 showing an alternate embodiment of the present invention.

DETAILED DESCRIPTION OF THE PREFERRED EMBODIMENTS

The following description of the preferred embodiments is merely exemplary in nature and is in no way intended to limit the invention or its application or uses.

Referring to FIGS. 1 and 2, there is shown a preferred embodiment of a micro EDM servo head, generally at 10, made in accordance with the teachings of the present invention. As shown, servo head 10 includes a driven wheel 12, a lead screw 14, a carriage block 16, a contact block 18, a support block 20, a support strut 22, an electrode guide support 24, electrode guide bottoms 26 and 28, and an electrode guide cover 30.

The servo head 10 is integrated with an electric discharge machine (not shown) and is controlled by a control unit (also not shown) as will be understood by one skilled in the art. The EDM incorporating the servo head 10 of the present invention can be one of a variety of forms known in the field. As shown in the preferred embodiment, driven wheel 12 is driven by the servo which controls the position of the tip 34 of electrode 32 relative to the work piece. The EDM process allows for very small features to be cut over relatively long depth. As such, the EDM process is ideally suited for cutting small passages in fuel injection nozzles as will be used as an example in the present disclosure. The present invention is not intended to be limited to such applications, and can be used in many other EDM processes including, but not limited to, machining dies, cutting materials with poor machinability properties, sharpening cutters, and cutting sheet stock with precise dimensional requirements, as well as other similar applications.

The fluid passages of fuel injection nozzles require extremely tight tolerances in order to meet the narrow range of flow rate requirements which are acceptable for use with current engine control modules used to meter fuel to the typical internal combustion engine. These tolerances allow for a 2 percent variation in fluid flow for a typical injector. When considering the holes in the injector are generally between 0.003 and 0.01 inches there is little room for variation.

The servo head 10 of the present invention provides an electrode guide system 36 which includes the electrode guide bottoms 26 and 28, a floating electrode guide cover 30, and a biasing means 38 which urges guide cover 30 toward guide bottoms 26 and 28. Electrode guide bottoms 26 and 28 of the present invention are mounted to electrode guide support 24 which is coupled to support block 20. Guide support 24 may be directly attached to support block 20 or, as shown, may be connected by way of support strut 22 which generally extends from support block 20. While the present embodiment is disclosed to include two guide bottoms, it is within the teachings of the present invention to utilize a one-piece guide bottom if sufficiently accurate machining of a longitudinal groove 40 (shown best in FIGS. 4 and 5) can be achieved.

Support block 20 rotationally supports an end 42 of lead screw 14 while another end 44 of lead screw 14 is connected to driven wheel 12. Carriage block 16 threadingly engages lead screw 14 such that as lead screw 14 is rotated by driven wheel 12 carriage block 16 moves along screw 14. When lead screw 14 is rotated in a first direction carriage block 16 moves toward support block 20, and moves away from support block 20 when lead screw 14 is rotated in a second direction.

Contact block 18 is connected to carriage block 16, and includes an electrical contact pad 46. Electrode 32 is guided along contact block 18 and forced against contact pad 46 such that electric current used in the machining process can flow from contact pad 46 to electrode 32 and ultimately be discharged at tip 34 when positioned near the fuel injection nozzle in the present example. The electrode passes from the contact block 18 through a longitudinal groove 40 of the electrode guide system 36 and is positioned near the work piece. As the sparks machine away the material from the work piece, carriage block 16 is moved toward support block 20 and thus advances the electrode 32 further into the work piece. The carriage block 16 must advance electrode 32 further than the amount of material removed from the work piece by each spark because electrode 32 itself is also somewhat vaporized or sacrificed during the machining.

Referring now to FIGS. 3–5, the guide system 36 is shown in greater detail. As shown in the preferred embodiment, the guide bottoms 26 and 28 each have a chamfered edge 48 and 50, respectively, formed on a first surface 51 of guide bottoms 26 and 28. When guide bottoms 26 and 28 are secure next to one another, with edges 48 and 50 adjacent one another, a longitudinal groove 40 is formed. Guide bottoms 26 and 28 are shown to be secured to electrode guide support 24. Electrode guide support 24 may be made of any material which has insulation properties and is dimensionally stable. Examples of such materials include phenolic composites, glass composites, and ceramic materials. The guide bottoms 26 and 28 are held in guide support 24 by retaining screws 52 and are laterally biased or side loaded by set screws 54. Set screws 54 may include pliable tips 56 to provide protection for guide bottoms 26 and 28, as well as provide some compliance as the side loading is applied and prevent loosening which may occur because of vibration during use. The inventors have found it best to partially tighten retaining screws 52 through apertures 58 in guide bottoms 26 and 28 and then tighten set screws 54. The retaining screws 52 are then tightened down completely to get the best positioning of the guide bottoms 26 and 28 thereby providing the truest groove 40.

Electrode guide cover 30 is located over and coordinated with the first surface 51 of guide bottoms 26 and 28 by a first set of pilot pins 60 near an entry end 62 and by a second set of pilot pins 64 at the tip end 66 of electrode guide system 36. Entry end 62 is at an opposite longitudinal end from tip end 66. Pilot pins 60 and 64 each threadingly engage guide bottoms 26 or 28 and pass through apertures 68, 69, 70, or 72. Clearance is provided between pilot pins 60 or 64 and apertures 68–72 such that guide cover 30 is slidingly piloted and freely floats over guide bottoms 26 and 28. Guide cover 30 is biased toward guide bottoms 26 and 28 by springs 74 and 76 which are located around pilot pins 64 near the tip end 66 of guide system 36 in the present embodiment. Alternately, the biasing of cover 30 toward bottoms 26 and 28 may be achieved in a variety of ways, including providing a spring cover 78 which is retained by pilot pins 64 and which provides a surface 80 upon which a one or more springs 74' act. Spring 74' is similar to springs 74 and 76 and are stainless steel compression springs in the present embodiment. This alternate embodiment is shown in FIG. 5. A further alternate embodiment for biasing guide cover 30' toward guide bottoms 26' and 28' is shown in FIG. 6. As shown, one or more studs 81 having heads 83 are inserted through apertures 85 and 87 such that heads 83 are in contact with an outward facing surface 89 of guide cover 30'. The biasing means 38' are then positioned against guide support 24' and are secured by retainers 91. As such, the cover 30' is urged toward guide bottoms 26' and 28' as in the prior embodiment.

Referring again to FIGS. 3–5, it will be noted that by positioning biasing means near the tip end 66 of electrode guide system 36, guide cover 30 is slightly inclined relative to guide bottoms 26 and 28. As a result, a greater amount of force is applied by guide cover 30 near the tip end 66 where electrode 32 extends from guide system 36. This force distribution provides greater control of the position of electrode 32 since the electrode is forced into a secure three point contact with guide system 36. The first contact point 82 is between cover 30 and a top position of electrode 32 as viewed in FIGS. 3 and 4. The second and third contact points 84 and 86, respectively, are between the electrode 32 and the chamfered edges 48 and 50 which form groove 40. The angle of the chamfered edges 48 and 50 depend upon the diameter of electrode 32. By controlling the angle of the chamfer, the three contact points 82, 84, and 86 can be positioned to provide a balanced spacing of the contact points. Ideally, the spacing between each contact point is 120 degrees, thereby providing the greatest control for centering electrode 32.

While the present embodiment has been disclosed as having biasing means 38 near tip end 66 of guide system 36, it is envisioned by the inventors that the biasing means can be more centrally located while still providing greater force near the tip end 66 of guide system 36. The desired force distribution can be achieved by forming guide cover 30 and guide bottoms 26 and 28 in a wedge formation and providing for pilot pins 60 and 64 to hold the guides, 26, 28 and 30, in the wedge alignment.

Guide cover 30 and guide bottoms 26 and 28 of the present invention are preferably made of a long wearing, low friction material. One such material used with success is crystaloy 3400 silicon nitride ($Si_3N_4$), although other materials having similar properties can be utilized with equal results. The entire guide cover 30' or guide bottoms 26' and 28' may be made of the selected material or an insert 93, as shown in FIG. 6, can be utilized. Insert 93 preferably, although not necessarily, covers the entire contact area between the electrode 32 and the guides 26', 28', and 30'. While insert 93 is shown incorporated in guide cover 30' only, it is within the teachings of the present invention to incorporate such an insert within a one piece guide bottom or as a portion of each of the guide bottoms 26' and/or 28'.

Insert 93 can be carried in a substrate 95 made of a wide range of materials similar to that used for electrode guide support 24 as discussed above.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

What is claimed is:

1. An electric discharge machining apparatus for machining a work piece, the apparatus having an electrode guide system for guiding and precisely controlling the position of an electrode of the apparatus, the electrode guide system comprising:

an electrode guide bottom having a first surface including a longitudinal groove therein;

a floating guide cover overlying said first surface of said electrode guide bottom to thereby cover said longitudinal groove; and biasing means for urging said floating guide cover toward said guide bottom wherein said floating guide cover is slidingly piloted relative to said guide bottom, the electrode being progressively located within said longitudinal groove with a force created by said biasing means as the electrode passes from an entry end to a tip end of said electrode guide system, wherein said force begins at said entry end and increases to said tip end, the electrode being forced into said groove with the greatest force near said tip end which is positioned near the work piece.

2. The electrode guide system of claim 1 wherein said electrode guide bottom is comprised of a first guide bottom and a second guide bottom, each of said guide bottoms having a chamfered edge thereon, wherein said first and second guide bottoms are secured to an electrode guide support such that said chamfered edges form said longitudinal groove, said first and second guide bottoms being longitudinally separated along said longitudinal groove.

3. The electrode guide system of claim 2 wherein said electrode guide support includes means for laterally biasing said first and second guide bottoms into contact with one another.

4. The electrode guide system of claim 1 wherein at least a portion of said electrode guide cover and said electrode guide bottom are made of silicon nitride.

5. The electrode guide system of claim 1 wherein said guide cover further comprises a substrate and an insert, said insert longitudinally extending along said guide system such that contact with the electrode is maintained along substantially the entire length of said guide system.

6. The electrode guide system of claim 5 wherein said insert is made of silicon nitride.

7. The electrode guide system of claim 1 wherein said biasing means is located closer to said tip end than to said entry end of said guide system.

8. The electrode guide system of claim 1 wherein said biasing means is a spring.

9. An electric discharge machining apparatus for machining a work piece, the apparatus having an electrode guide system for guiding and precisely controlling the position of an electrode of the apparatus, the electrode guide system comprising:

a first electrode guide bottom having a chamfered edge thereon;

a second electrode guide bottom having a chamfered edge thereon;

an electrode guide support for receiving and retaining said first and second electrode guide bottoms relative to one another such that said chamfered edges are adjacent one another, said chamfered edges thereby forming a groove;

a floating guide cover slidingly piloted over and covering said groove; and biasing means for urging said floating guide cover toward said groove such that the electrode of the apparatus is slidably secured in said groove with a force beginning at an entry end of said groove and increasing to a tip end of said groove, wherein said tip end is positioned near said workpiece.

10. The electrode guide system of claim 9 wherein the electrode is secured by at least three contact points with said guide system, a first contact point being with said chamfered edge on said first guide bottom, a second contact point being with said chamfered edge on said second guide bottom, and a third contact point being on said floating guide cover.

11. The electrode guide system of claim 9 wherein said biasing means is located nearer to a tip end of said electrode guide system than to an entry end of said electrode guide system.

12. The electrode guide system of claim 9 wherein said first and second electrode guide bottoms are made of silicon nitride.

13. The electrode guide system of claim 9 wherein said floating guide cover is made of silicon nitride.

14. The electrode guide system of claim 9 wherein said guide cover is further comprised of a substrate and an insert, said insert coordinated with said chamfered edges of said first and second electrode guide bottoms such that said insert contacts the electrode along substantially the entire length of said insert.

15. The electrode guide system of claim 14 wherein said insert is made of silicon nitride.

16. An electric discharge machine apparatus for machining a work piece, the apparatus having a control system for sensing and processing information, the control system being connected to an electric discharge machine servo head which responds to information provided by the control system by advancing or retracting an electrode of the apparatus such that the electrode machines the work piece, said electric discharge machine servo head comprising:

a support block having an electrode guide system attached thereto;

a contact block movable relative to said electrode guide system, said contact block having means for releasably securing the electrode of the apparatus and for providing electrical contact with said electrode; and means for selectively moving said contact block relative to said electrode guide system such that the electrode of the apparatus is slidingly moved through said electrode guide system whereby the electrode removes material from the work piece by electrical arcing between the electrode and the work piece.

17. The electric discharge machine servo head of claim 16 wherein said means for selectively moving said contact block is comprised of a servo responsive to the control system of the apparatus, a lead screw having a first end rotatively driven by said servo, a second end of said lead screw being rotationally supported by said support block, wherein said contact block threadingly engaging said lead screw such that said contact block moves along said lead screw as said screw is rotated by said servo.

18. The electric discharge machine servo head of claim 16 wherein said electrode guide system further comprises:

an electrode guide bottom having a first surface including a longitudinal groove therein;

a floating guide cover coordinated with said first surface of said electrode guide bottom; and biasing means for urging said floating guide cover toward said guide bottom wherein said floating guide cover is slidingly piloted relative to said guide bottom, the electrode being progressively located within said longitudinal groove with an increasing force created by said biasing means as the electrode passes from an entry end to a tip end of said electrode guide system, the electrode being forced into said groove with the greatest force near said tip end which is positioned near the work piece.

19. The electric discharge machine servo head of claim 18 wherein said electrode guide bottom is comprised of a first guide bottom and a second guide bottom, each of said guide bottoms having a chamfered edge thereon, wherein said first and second guide bottoms are secured to an electrode guide support such that said chamfered edges form said longitudinal groove, said first and second guide bottoms being longitudinally separated along said longitudinal groove.

20. The electric discharge machine servo head of claim 18 wherein at least a portion of said electrode guide cover and said electrode guide bottom are made of silicon nitride.

21. The electric discharge machine servo head of claim 18 wherein said guide cover is further comprised of a substrate and an insert, said insert longitudinally extending along said guide system such that contact with the electrode is maintained along substantially the entire length of said guide system, said insert being made of silicon nitride.

* * * * *